(12) United States Patent
Chen

(10) Patent No.: US 6,368,531 B1
(45) Date of Patent: Apr. 9, 2002

(54) FORMING METHOD FOR A CUP BOTTOM CONTAINING AN OBJECT

(76) Inventor: Li-Hsiu Shih Chen, P.O. Box 90, Tainan City (TW)

( * ) Notice: Subject to any disclaimer, the term of this patent is extended or adjusted under 35 U.S.C. 154(b) by 0 days.

(21) Appl. No.: 09/490,453

(22) Filed: Jan. 24, 2000

(51) Int. Cl.[7] .......................... B29C 37/02; B29C 39/10; B29C 39/12
(52) U.S. Cl. ....................... 264/161; 264/138; 264/162; 264/271.1; 264/129; 264/255; 264/279.1; 264/246; 264/267; D7/516
(58) Field of Search ................................. 264/138, 275, 264/1.31, 108, 246, 271.1, 267, 255, 129, 161, 162, 279.1; 215/2; D7/509, 514, 515, 516, 517, 518, 519, 520, 521

(56) References Cited

U.S. PATENT DOCUMENTS

| 777,305 | A | * | 12/1904 | Priestnail |
| 3,057,016 | A | * | 10/1962 | Schilling |
| 3,271,486 | A | * | 9/1966 | Dunlop |
| 3,886,248 | A | * | 5/1975 | Nicholson |
| D247,540 | S | * | 3/1978 | Iwashita |
| D301,002 | S | * | 5/1989 | Kalamaras et al. |

* cited by examiner

Primary Examiner—Jan H. Silbaugh
Assistant Examiner—Geoffrey P. Shipsides

(57) ABSTRACT

A forming method for a cup bottom containing an object. The method includes a first step of forming a cup body with a thick bottom provided with a large recess opening to a lower side, a second step of filling transparent resin in the large recess, a third step of burying an object such as a small insect, a plant, a flower, a grass, water, etc., and a fourth step of scraping a lower edge of the large recess flat and smooth so as to enable the cup to stand on something. This a cup is made with a three-dimensional object embedded therein.

3 Claims, 7 Drawing Sheets

FORMING METHOD FOR A CUP BOTTOM CONTAINING AN OBJECT

BACKGROUND OF THE INVENTION

This invention relates to a forming method for a cup bottom containing an object, particularly to one to bury an object such as a little insect, a plant, a flower, a grass, water, etc., in a large recess formed in the bottom and then fill transparent resin in the large recess. Then the lower surface of the bottom is scraped smooth and flat, letting the object seen clearly from outside of the cup, showing 3D visual appearance to the cup.

Conventional cups generally are made to have only a single color, monotonous to look at, or printed with colors or adhered with pictures or patterns to increase beautiful appearance to attract curiosity of would-be buyers. But those conventional cups only present a flat surface without 3D feeling. And the pictures or patterns printed or adhered may fade slowly or peel off owing to moisture.

SUMMARY OF THE INVENTION

The objective of the invention is to offer a forming method for a cup bottom containing an object for presenting 3D appearance to enhance the worth of the cup.

The feature of the invention is a large recess formed in a bottom of a cup, a transparent resin filled in the large recess and an object buried in the resin while the resin has not yet hardened, and the lower surface of the bottom scraped flat and smooth after the resin hardens.

BRIEF DESCRIPTION OF THE DRAWINGS

This invention will be better understood by referring to the accompanying drawings, wherein.

DETAILED DESCRIPTION OF THE PREFERRED EMBODIMENT

Figure 1:
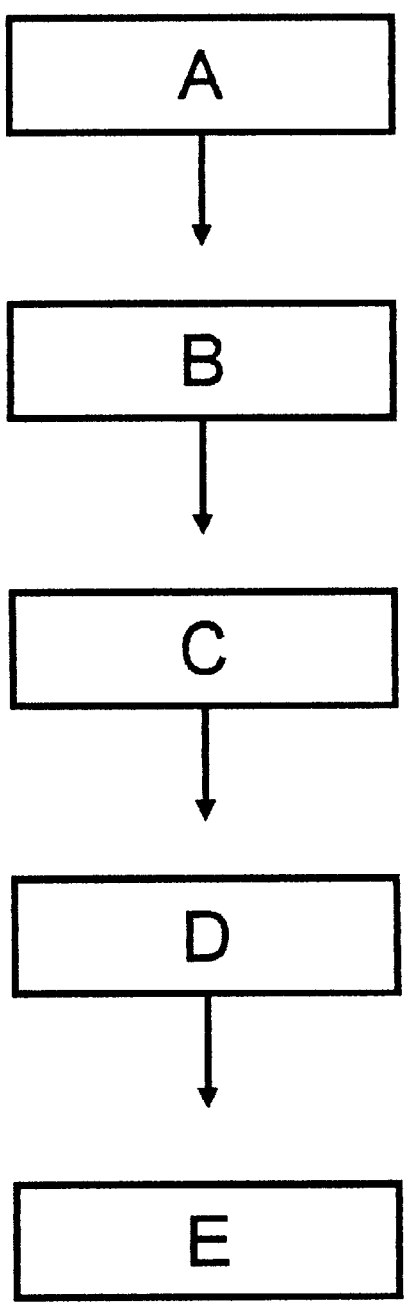
FIG. 1 is a flow chart of a forming method for a cup bottom containing an object in the present invention.

A preferred embodiment of a forming method for a cup bottom containing an object in the present invention, as shown in FIG. 1, includes a plurality of steps, which are described below.

Figure 2:
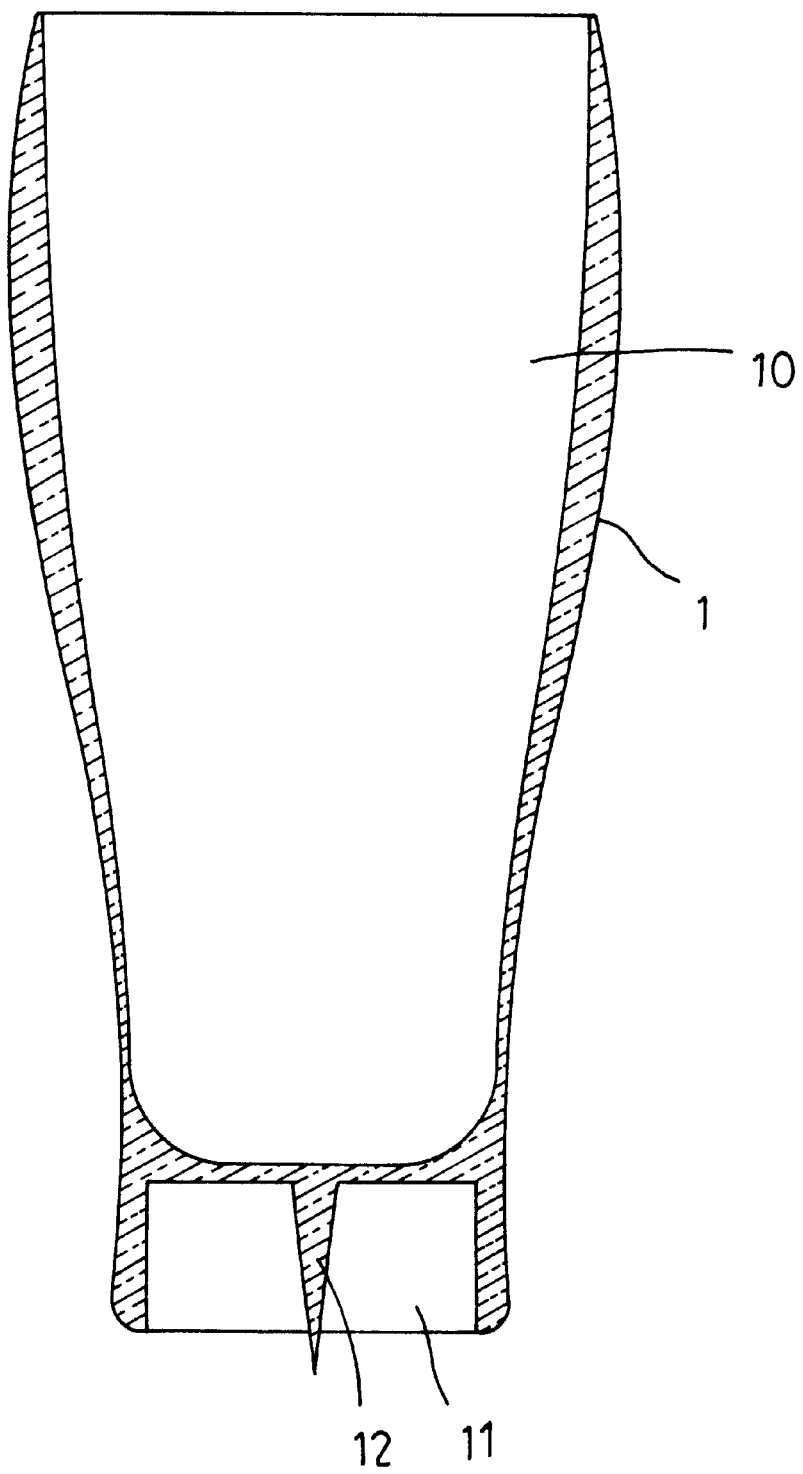
FIG. 2 is a cross-sectional view of the bottom of a cup made with the forming method in the present invention.
Figure 3:
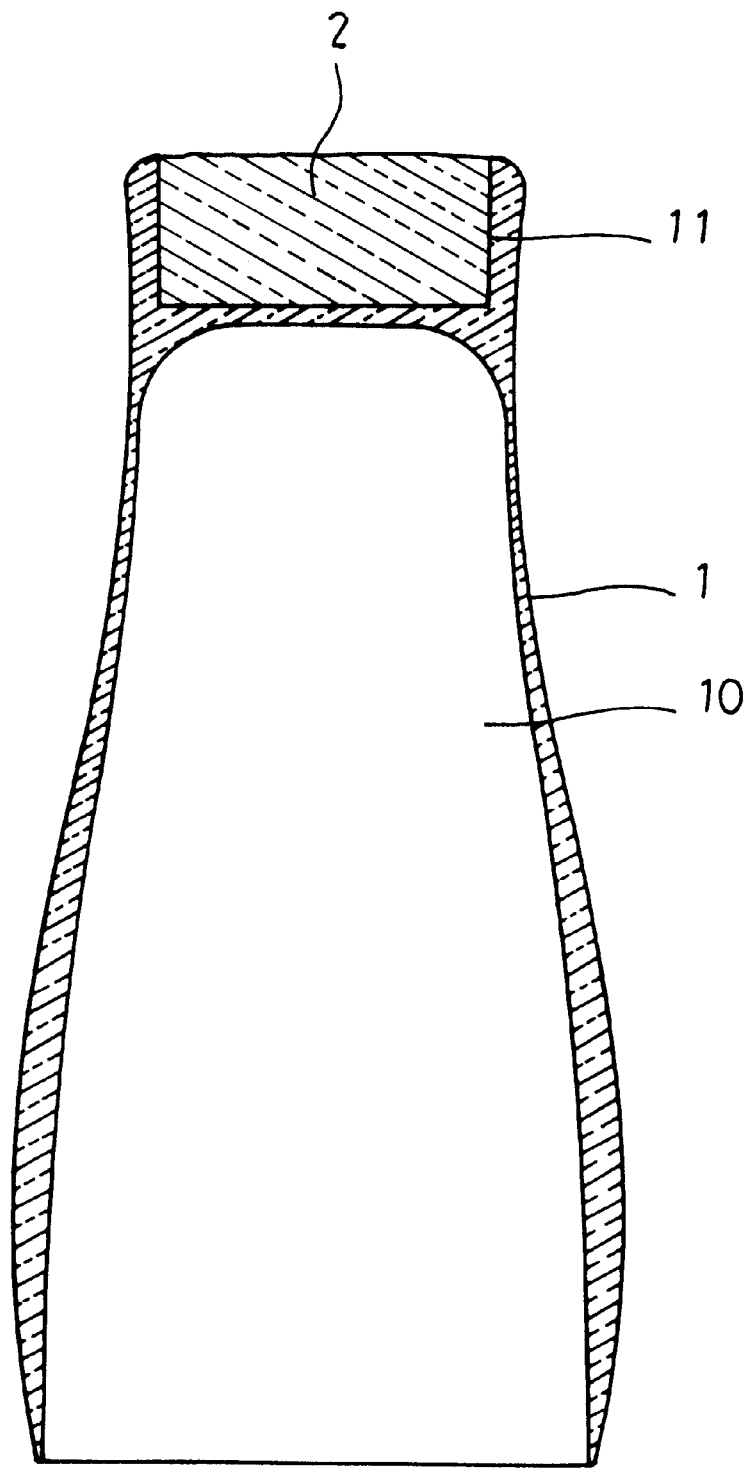
FIG. 3 is a cross-sectional view of the bottom of a cup filled with resin in the present invention.
Figure 4:
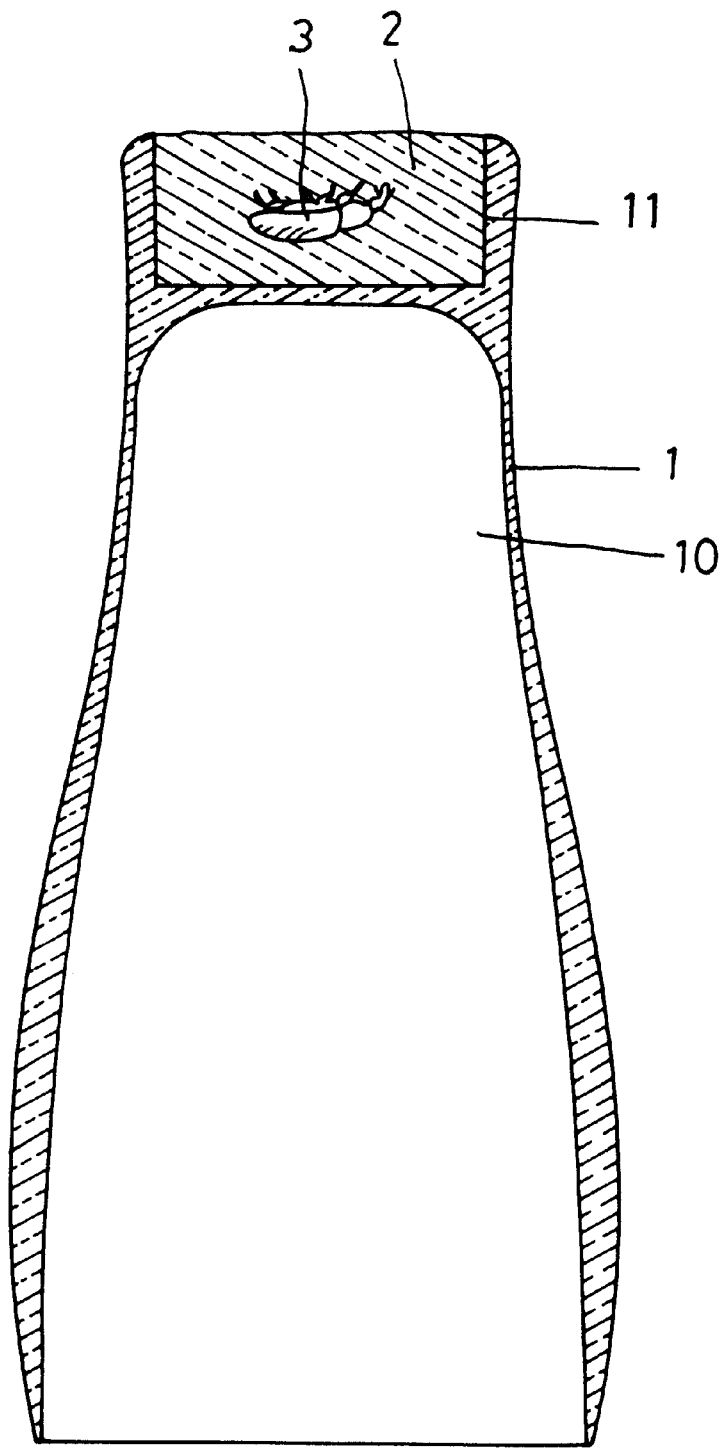
FIG. 4 is a cross-sectional view of the bottom of a cup with an object buried in the resin filled in a large recess of the bottom in the present invention.
Figure 5:
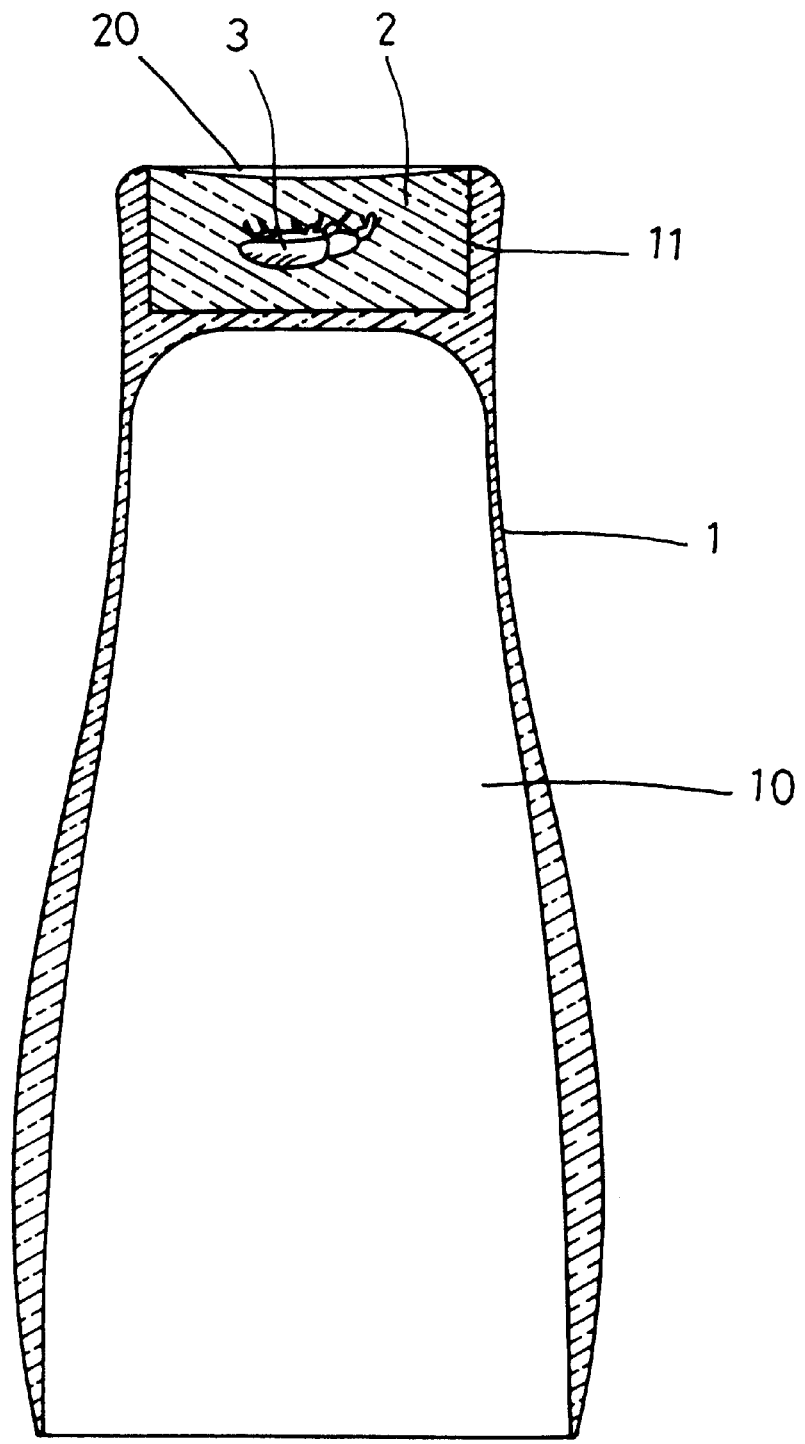
FIG. 5 is a cross-sectional view of the bottom of a cup scraped smooth and flat in the present invention.

1. The first step A is to form a transparent cup 1 by mold injecting process, as shown in FIG. 2, and the cup 1 has a hollow interior chamber 10, and a large recess 11 formed in a thick bottom opening to a lower side. Some excessive material 12 may remain in the mouth of the large recess 11 after injecting process, and have to be removed to make the inner surfaces of the large recess 11 flat and smooth.

2. The second step B is to fill transparent resin in the large recess 11. The cup 1 is inverted to let the large recess 11 facing upward, and melt transparent resin 2 is filled in the large recess 11 in the bottom of the cup 1.

3. The third step C is to bury an object 3 such as a small insect, a plant, a flower, a grass, water, etc. in the resin 2.

4. The fourth step D is to scrape the lower surface of the large recess 11 smooth and flat after the resin 2 hardens, and then the lower surface of the large recess 11 is ground to form a little concave form 20 when seen from a side so as to enable the cup 1 stand stably on something.

Figure 6:
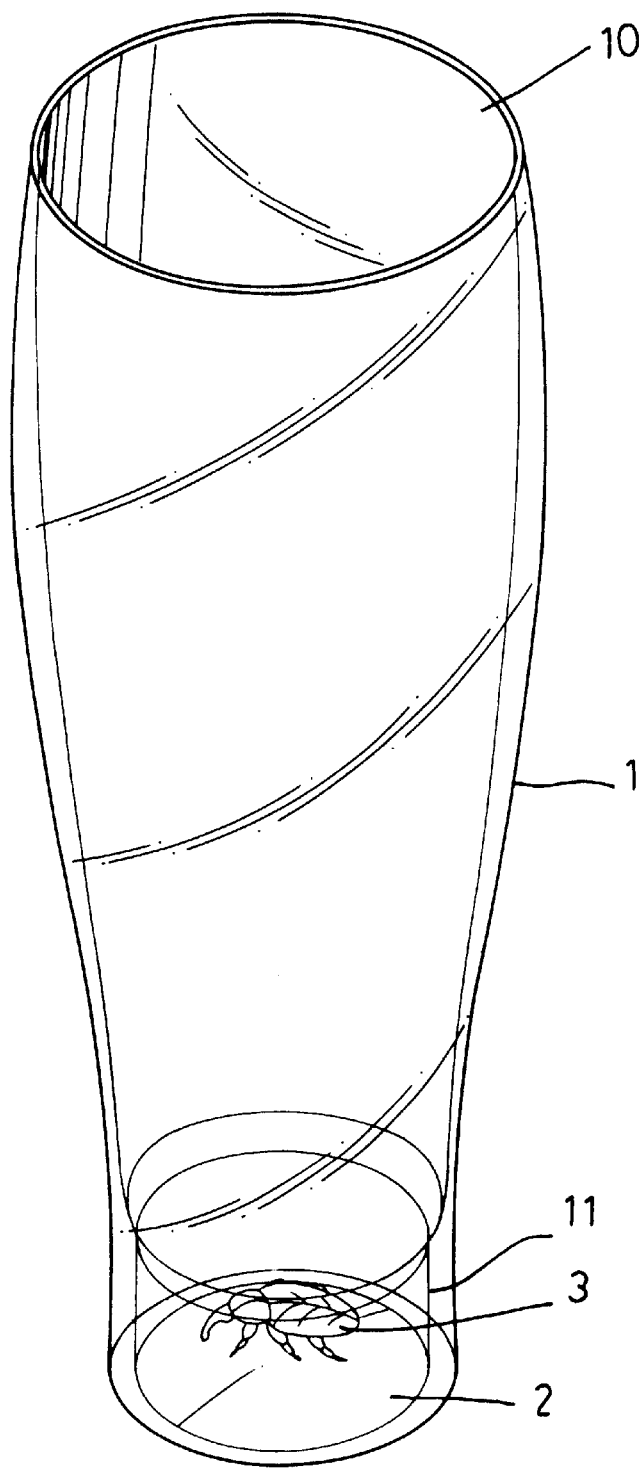
FIG. 6 is a perspective view of a cup with the bottom containing an object in the present invention; and, FIG. 7 is a perspective view of a cup with a double layer and with the bottom containing an object in the present invention.

5. The fifth step E is to check a product finishing all the four steps described above, and any cup with a flaw is to be discarded. A complete cup 1 has the object 3 in the bottom looking like 3D decoration when seen through the wall of the cup 1, as shown in FIG. 6.

Figure 7:
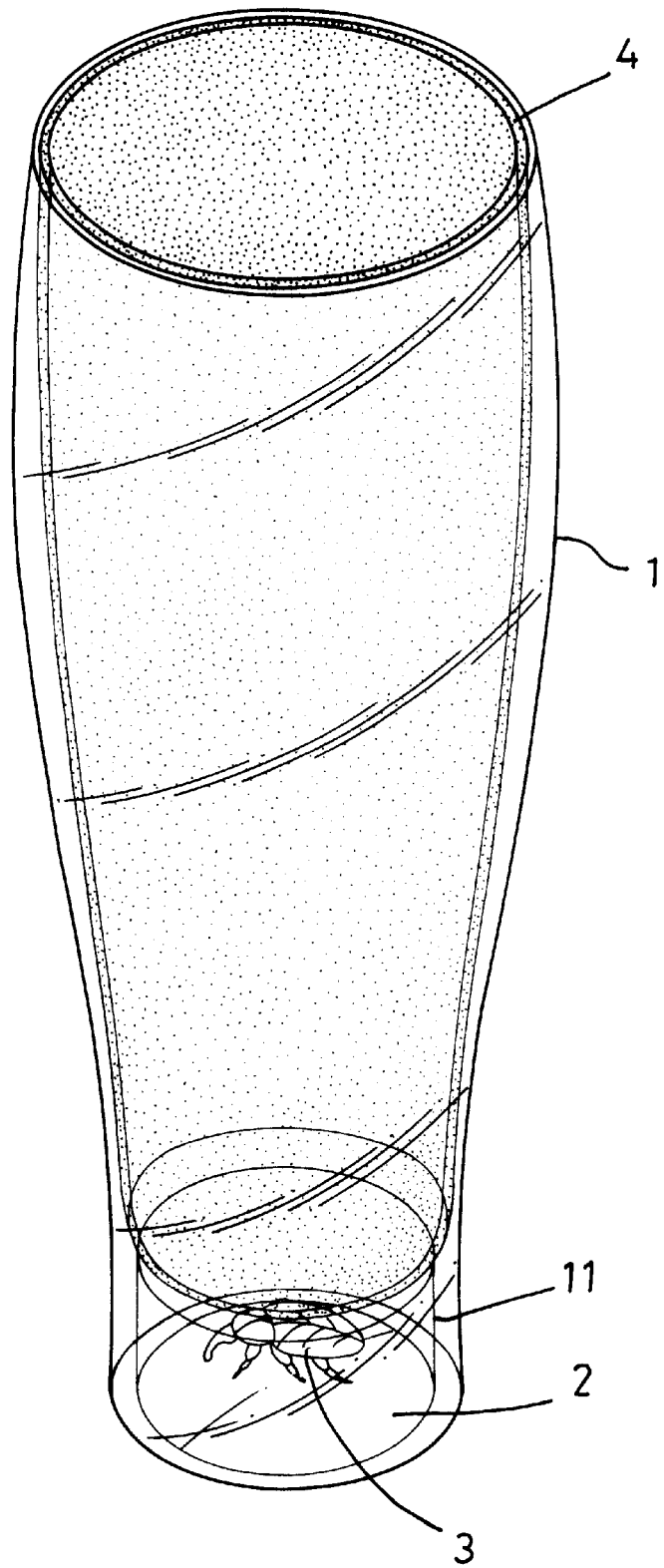

In addition, an inner layer cup 4 may be added to the cup 1, as shown in FIG. 7. And the inner layer cup 4 is colored to be seen through the cup 1 (becoming a first layer cup), together with the color of the object in the bottom to enhance 3D effect and upgrade the worth of the cup.

While the preferred embodiment of the invention has been described above, it will be recognized and understood that various modifications may be made therein and the appended claims are intended to cover all such modifications which may all within the spirit and scope of the invention.

What is claimed is:

1. A method for forming a cup having a three-dimensional object in a bottom thereof, the method comprising the steps of:

forming a transparent cup body by a mold injection process in which the bottom of the cup body includes a recess opening and an excessive material extending from the bottom of the cup body in the recess opening;

removing the excessive material from the recess opening of the bottom of the cup body to make the surfaces of the recess opening smooth inverting the cup body and filling the recess opening with liquified transparent resin;

burying the three-dimensional object in the transparent resin before the resin hardens and permitting the resin to harden; and scraping the upper surface of the resin after it has hardened to form a smooth and flat surface at the bottom of the cup body so that the cup body can stand stably on a surface.

2. The method for forming a cup having a three-dimensional object in a bottom thereof, as claimed in claim 1, the method further comprising:

providing a colored inner layer cup inside the cup so that the color of the colored inner layer cup is seen through the cup body.

3. The method for forming a cup having a three-dimensional object in a bottom thereof, as claimed in claim 1, wherein the three-dimensional object is selected from the group consisting of an insect, a plant and water.

* * * * *